US012130195B2

(12) United States Patent
Snyder et al.

(10) Patent No.: US 12,130,195 B2
(45) Date of Patent: Oct. 29, 2024

(54) ACTIVE ALIGNMENT OF OPTICAL DIE TO OPTICAL SUBSTRATES

(71) Applicant: Psiquantum, Corp., Palo Alto, CA (US)

(72) Inventors: Bradley Snyder, Santa Clara, CA (US); Ramakanth Alapati, Dublin, CA (US); Gabriel J. Mendoza, San Francisco, CA (US); Soumyadipta Basu, San Ramon, CA (US)

(73) Assignee: Psiquantum, Corp., Palo Alto, CA (US)

( * ) Notice: Subject to any disclaimer, the term of this patent is extended or adjusted under 35 U.S.C. 154(b) by 657 days.

(21) Appl. No.: 17/322,814

(22) Filed: May 17, 2021

(65) Prior Publication Data

US 2021/0270693 A1    Sep. 2, 2021

Related U.S. Application Data

(62) Division of application No. 16/786,830, filed on Feb. 10, 2020, now Pat. No. 11,035,752.

(51) Int. Cl.
 *G01M 11/02*   (2006.01)
(52) U.S. Cl.
 CPC .............................. *G01M 11/0214* (2013.01)
(58) Field of Classification Search
 CPC ..... G01M 11/0214; G01M 11/30; G02B 6/34; G02B 6/4225
 See application file for complete search history.

(56) References Cited

U.S. PATENT DOCUMENTS

| 6,686,993 | B1 | 2/2004 | Karpman et al. |
| 11,035,752 | B1* | 6/2021 | Snyder ............... G01M 11/0214 |
| 2002/0034363 | A1 | 3/2002 | Wickman et al. |
| 2002/0131729 | A1 | 9/2002 | Higgins |
| 2003/0026556 | A1 | 2/2003 | Mazotti et al. |
| 2006/0067607 | A1 | 3/2006 | Fang et al. |
| 2006/0245699 | A1 | 11/2006 | Xu et al. |
| 2014/0363905 | A1 | 12/2014 | McShane et al. |
| 2015/0016817 | A1 | 1/2015 | Hara et al. |
| 2016/0057855 | A1 | 2/2016 | Riel |
| 2018/0062748 | A1 | 3/2018 | Mack et al. |
| 2021/0270693 | A1* | 9/2021 | Snyder ............... G01M 11/0214 |

OTHER PUBLICATIONS

PCT/US2021/017291, "International Preliminary Report on Patentability", Aug. 25, 2022, 9 pages.
PCT/US2021/017291, "International Search Report and Written Opinion", May 31, 2021, 13 pages.
U.S. Appl. No. 16/786,830, "Non-Final Office Action", Oct. 28, 2020, 8 pages.
U.S. Appl. No. 16/786,830, "Notice of Allowance", Feb. 19, 2021, 8 pages.
EP21753904.8, "Extended European Search Report", Feb. 7, 2024, 8 pages.

* cited by examiner

*Primary Examiner* — Minh N Trinh
(74) *Attorney, Agent, or Firm* — Kilpatrick Townsend & Stockton LLP (57) ABSTRACT

An assembly system for assembling an optical die to an optical substrate includes test equipment configured to test optical couplers formed between the optical die and the optical substrate. The assembly system is configured to adjust an alignment of the optical die relative to the optical substrate until the optical couplers meet a performance metric. After the performance metric is met the optical die is permanently attached to the optical substrate.

15 Claims, 8 Drawing Sheets

ACTIVE ALIGNMENT OF OPTICAL DIE TO OPTICAL SUBSTRATES

CROSS-REFERENCE TO RELATED APPLICATION

This patent application is a divisional of U.S. patent application Ser. No. 16/786,830, filed Feb. 10, 2020, now U.S. Pat. No. 11,035,752, issued Jun. 15, 2021, the disclosure of which is hereby incorporated by reference in its entirety for all purposes.

BACKGROUND

Many electronic devices in use today, such as for example, Ethernet systems, audio, communications systems and forthcoming quantum computers include one or more optical circuits. In some applications the optical circuits are constructed by attaching one or more optical die to an optical substrate that performs optical routing and communications between the optical die. When each optical die is attached to the optical substrate, one or more optical couplers are formed between each optical die and the optical substrate so optical signals can be passed to and from the optical die. Some applications may benefit from optimal alignment of the optical couplers to minimize optical signal loss and/or distortion to meet requisite system requirements.

Current assembly machines that align and attach optical die to the optical substrate use camera imaging of the top of the substrate and the bottom of the die to align geometric features of the die to geometric features of the substrate. However, these image-based alignment systems only align geometric features and do not adjust the position of the die to optimize optical signal loss and distortion of the optical coupler formed between the die and the substrate. New assembly machines that optimize the performance of the optical couplers are needed to minimize signal loss and distortion in optical systems.

SUMMARY

In some embodiments a tool for an assembly machine comprises a connector for connecting the tool to the assembly machine and a mating surface for temporarily interfacing the tool to an optical die. A retention apparatus is configured to temporarily couple the optical die to the mating surface and a tool optical coupler is positioned at the mating surface and is configured to form an optical connection to the optical die when the optical die is positioned at the mating surface. In various embodiments the tool optical coupler is a terminated optical fiber.

In some embodiments the tool optical coupler is configured to operatively couple optical test equipment to the optical die. In various embodiments the tool optical coupler is a first tool optical coupler and the tool includes a second tool optical coupler configured to form an optical connection to the optical die when the optical die is positioned at the mating surface. In some embodiments the retention apparatus is a vacuum port that applies a vacuum to the optical die to temporarily couple the optical die to the mating surface.

In some embodiments a method of aligning an optical die to an optical substrate comprises temporarily coupling an optical die to a tool and positioning the tool such that the optical die is at a surface of the optical substrate to form at least one optical coupler between the optical substrate and the optical die. A first optical performance test of the at least one optical coupler is performed. The tool is moved such that the optical die moves relative to the optical substrate and a second optical performance test of the at least one optical coupler is performed. The results of the first optical performance test are compared with results of the second optical performance test.

In some embodiments the optical substrate includes at least one optical connector that enables optical test equipment to perform the first and the second optical performance test of the at least one optical coupler. In various embodiments the tool includes at least one optical connector that enables optical test equipment to perform the first and the second optical performance test of the at least one optical coupler. In some embodiments the at least one optical connector optically couples the optical test equipment through the optical die and to the at least one optical coupler. In various embodiments before temporarily coupling the optical die to the tool, the tool optical couplers are aligned with die optical couplers.

In some embodiments the tool is repetitively moved, optical performance testing is repetitively performed and comparing results of the optical performance testing is repetitively performed until the at least one optical coupler meets a predetermined performance value. In some embodiments after the optical coupler meets the predetermined performance value the optical die is permanently attached to the optical substrate.

In some embodiments a system for assembling an optical die to an optical substrate comprises a gantry mechanism and a tool attached to the gantry mechanism. The toll includes a mating surface for temporarily interfacing the tool to the optical die and a retention apparatus configured to temporarily couple the optical die to the interface surface. A tool optical coupler is positioned at the mating surface and is configured to form an optical connection to the optical die when the optical die is positioned at the mating surface. A platform is configured to retain the optical substrate and optical test equipment is operatively coupled to the tool optical coupler. A controller is configured to receive input from the optical test equipment.

In some embodiments the tool optical coupler is operatively coupled to an optical coupler formed between the optical die and the optical substrate when the optical die is positioned on the optical substrate. In various embodiments the optical test equipment is configured to test the optical coupler and transmit results to the controller. In some embodiments the controller compares the results to a threshold and determines if the optical die needs to be moved relative to the optical substrate. In some embodiments the tool is a first tool of a plurality of tools.

In some embodiments a plasma cleaner is configured to plasma clean a bonding surface of the optical die. In various embodiments a plasma cleaner configured to plasma clean a bonding surface of the optical substrate. In some embodiments the controller uses the tool to apply a force between the optical die and the optical substrate to fusion bond the optical die to the optical substrate.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use

DETAILED DESCRIPTION

Some embodiments of the present disclosure relate to methods for optimizing the alignment of an optical die on an optical substrate. While the present disclosure can be useful for a wide variety of configurations, some embodiments of the disclosure are particularly useful for optical circuits that benefit from optimized performance of optical couplers formed between optical die and optical substrates, as described in more detail below.

For example, in some embodiments, one or more optical couplers are formed between an optical die and an optical substrate when the optical die is attached to the optical substrate. Before the die is permanently attached to the optical substrate, the optical couplers can be tested and the alignment can be adjusted, if necessary. In one embodiment in-situ optical test equipment is coupled to the optical substrate to test the optical couplers. In another embodiment a tool that temporarily holds the optical die has tool optical couplers that couple the test equipment to the optical die. In some embodiments the optical die can include features that couple the test equipment to the optical couplers formed between the optical die and the optical substrate. To optimize the performance of the optical couplers the optical die can be moved relative to the optical substrate until the desired performance of the optical couplers is achieved, then the die can be permanently bonded to the optical substrate.

In order to better appreciate the features and aspects of optimizing alignment of optical die to optical substrates according to the present disclosure, further context for the disclosure is provided in the following section by discussing one particular implementation of system and an apparatus for aligning optical die to optical substrates. These embodiments are for example only and other embodiments can use other types of systems and devices to optimize alignment of optical die to optical substrates.

Figure 1:
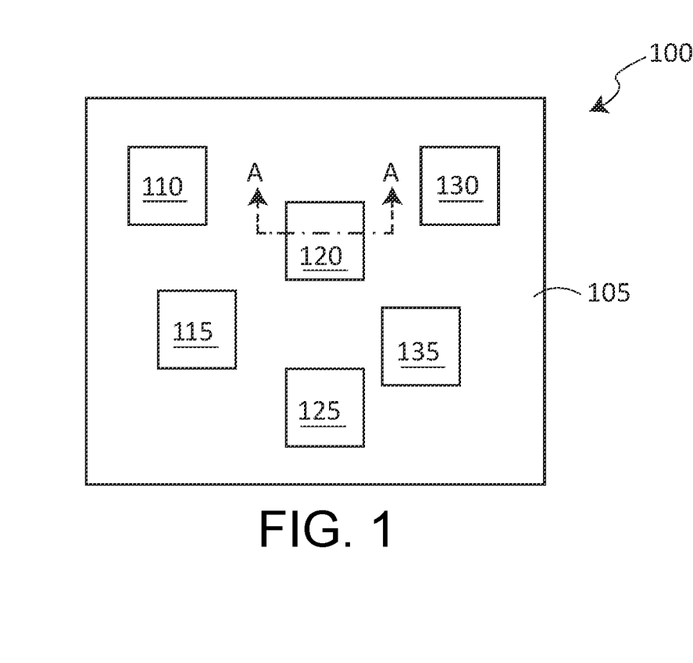
FIG. 1 is a simplified top plan view of an optical assembly, according to an embodiment of the disclosure.

FIG. 1 illustrates a simplified top plan view of an optical assembly 100. As shown in FIG. 1, optical assembly 100 includes an optical substrate 105 with multiple optical die 110-135 attached to it. In some embodiments optical assembly 100 can be used as a portion of a quantum computer, Ethernet device, communications device or other optical system. One or more optical couplers (not shown in FIG. 1) can be formed between each optical die 110-135 and optical substrate 105 so the optical substrate can perform optical communications between each optical die. In some embodiments each optical die 110-135 can perform one or more optical functions such as for example, switching an optical signal, generating an optical signal, amplifying an optical signal and/or filtering an optical signal.

In some embodiments the performance specifications of optical assembly 100 may benefit from optimized performance of the one or more optical couplers formed between optical die 110-135 and the optical substrate. In various embodiments, performance of one or more of the optical couplers can be optimized by using an assembly machine that is operatively coupled to in-situ test equipment that tests the optical performance of the optical couplers while the simultaneously adjusting alignment of one or more of the optical die 110-135 to the optical substrate, as described in more detail below.

Figure 2:
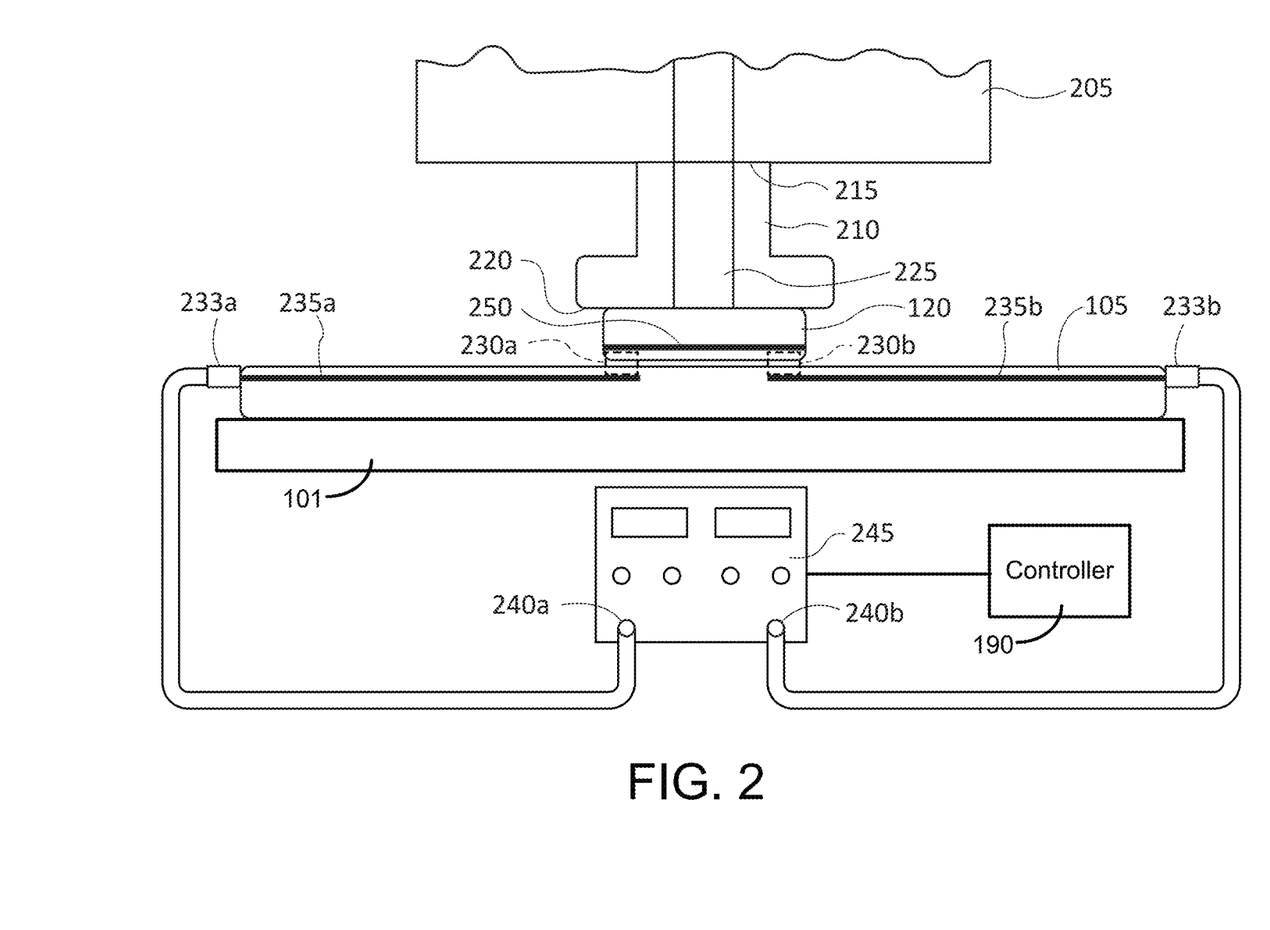
FIG. 2 is a simplified cross-sectional view of the optical die illustrated in FIG. 1 during assembly to the optical substrate.

FIG. 2 illustrates simplified cross-sectional view A-A of optical die 120 shown in FIG. 1, during assembly to optical substrate 105, which is disposed on a platform 101. As shown in FIG. 1 an assembly machine 205 (e.g., a pick and place machine) is connected to a tool 210 via a connector 215. Tool 210 includes a mating surface 220 for temporarily coupling tool to optical die 120 via a vacuum port 225. Tool 210 is positioned such that optical die 120 is positioned adjacent optical substrate 105. Optical die 120 is positioned proximate optical substrate 105 such that first and second optical couplers 230a, 230b, respectively, are formed between optical die 120 and optical substrate 105. First and second optical couplers 230a, 230b, respectively, enable optical signals to pass between optical die 120 and optical substrate 105. In one embodiment first and second optical couplers 230a, 230b, respectively, are formed using adiabatic (in-plane) coupling between optical die 120 and substrate 105, however other embodiments can use different optical coupling architectures, as described in more detail below.

As further shown in FIG. 2, optical substrate 105 includes a first waveguide 235a that can be coupled between a first port 240a of in-situ test equipment 245 and first optical coupler 230a. In some embodiments in-situ test equipment 245 can be coupled to optical substrate 105 using test connectors 233a, 233b. In some embodiments an output terminal of the in-situ test equipment 245 is coupled to an input terminal of a controller 190. In some embodiments test connectors 233a, 233b are edge coupled while in other embodiments they can be adiabatic (in-plane) coupled, out of plane (e.g., grating), or other types of optical couplers. First optical coupler 230a can couple optical signals from first waveguide 235a to optical die 120.

Similarly, optical substrate 105 includes a second optical waveguide 235b that can be coupled between a second port 240b of in-situ test equipment 245 and second optical coupler 230b. Second optical coupler 230b can couple optical signals from second waveguide 235b to optical die 120. In some embodiments optical die 120 can include a die waveguide 250 that couples first optical coupler 230a to second optical coupler 230b. In various embodiments, optical die 120 can include features to modify and/or manipulate the coupled optical signals.

Assembly machine 205 can be used in conjunction with in-situ test equipment 245 that performs optical testing of first and second optical couplers 230a, 230b, respectively, via optical substrate 105 during assembly. More specifically, in some embodiments assembly machine 205 adjusts a location of optical die 120 relative to optical substrate 105 to optimize the optical signal loss and/or distortion of first and second optical couplers 230a, 230b, respectively, as indicated by in-situ test equipment 245. In some embodiments, testing performed by in-situ test equipment 245 can include: insertion loss, return loss, optical time domain reflectometry (OTDR), and/or power loss of first and second optical couplers 230a, 230b, respectively, among others. In some embodiments assembly machine 205 can move optical die 120 in East-West (e.g., X), North-South (e.g., Y), Up-Down (e.g., Z) directions in addition to rotation (e.g., theta) to optimize performance of first and second optical couplers 230a, 230b, respectively.

In the embodiment illustrated in FIG. 2, optical die 120 is adiabatically coupled to optical substrate 105, however other coupling configurations can be used, as described in more detail below. In some embodiments optical die 120 can be held in contact with optical substrate 105 to form temporary first and second optical couplers 230a, 230b, respectively, but without adequate force to permanently attach the optical die to the optical substrate. To optimize performance of first and second optical couplers 230a, 230b, respectively, optical die 120 can either be moved while in contact with optical substrate 105 or the optical die can be elevated (e.g., moved in Z) out of contact with the optical substrate, moved (e.g. in X, Y and/or theta), then lowered back into contact with the optical substrate to perform further in-situ testing.

In further embodiments, during in-situ testing optical die 120 can be held above optical substrate 105 with a small gap. In some embodiments the gap between optical die 120 and optical substrate 105 can be between 25 and 0.05 microns and in further embodiments can be between 10 and 0.1 microns.

As optical die 120 is being "adjusted" (e.g., moved in X, Y and/or theta) relative to optical substrate 105, in-situ test equipment 245 monitors one or more optical characteristics of first and second optical couplers 230a, 230b, respectively, formed between optical die 120 and optical substrate 105. In some embodiments, in-situ test equipment 245 is operatively coupled to assembly machine 205 so the assembly machine can optimize the optical alignment of first and second optical couplers 230a, 230b, respectively. In various embodiments assembly machine 205 can use one or more algorithms to minimize the time for optimal alignment of optical die 120 on optical substrate 105. For example, in one embodiment a correlation can be developed such that when in-situ test equipment 245 identifies a relatively high return loss at a certain wavelength this indicates that first optical coupler 230a needs improved North-South alignment and a high insertion loss at a broad range of wavelengths may indicate that both first and second optical couplers 230a, 230b, respectively, need improved alignment in an East-West direction. Such algorithms may be used to minimize the number of alignment adjustments performed to achieve the requisite optical coupler performance.

In some embodiments assembly machine 205 can monitor and control an amount of force applied between the optical die 120 and optical substrate 105. In one embodiment a limited amount of force can be applied to optical die 120 during alignment such that the optical die does not permanently attach to optical substrate 105, such as when fusion bonding is used. In other embodiments assembly machine 205 can modulate the applied force between optical die 120 and optical substrate 105 so first and second optical couplers 230a, 230b, respectively, perform above a minimum threshold (e.g., a minimum return loss). The modulated force can be used to accommodate surface imperfections between optical die 120 and optical substrate 105 so that all optical couplers are tested on an equal basis.

In some embodiments optical die 120 can be attached to optical substrate 105 using a fusion bonding process that atomically bonds the optical die to the optical substrate. Fusion bonding can be used when optical die 120 and optical substrate 105 each have a prepared bonding surface and adequate force is applied between the optical die and the optical substrate, as described in more detail below.

In some embodiments optical die 120 can be attached to optical substrate 105 using an adhesive, epoxy, glue or other bonding agent. In one embodiment a UV curable adhesive is pre-applied to optical die 120, the optical die is aligned such that first and second optical couplers 230a, 230b, respectively, have optimized performance, then the assembly is exposed to UV light to secure the optical die in place. In other embodiments a snap-cure or other post alignment curing processes can be used. In another embodiment, assembly machine 205 can determine an optimal X, Y and theta position for optical die 120, record the position, move the optical die aside, apply a bonding agent to optical substrate 105 and/or optical die, then replace the optical die to the determined X, Y and theta position for permanent attachment.

In some embodiments any of the alignment and bonding processes described above can be used to align and attach an optical wafer or a portion of an optical wafer to an optical substrate, as opposed to a aligning and attaching a single optical die. In further embodiments more than one piece of in-situ test equipment can be used and two, three, four or more optical signals can be simultaneously coupled to an optical die or optical substrate to optimize the optical alignment and optical performance of one or more optical couplers.

As described in FIG. 2 first and second optical couplers 230a, 230b, respectively, are formed using adiabatic coupling. One of skill in the art with the benefit of this disclosure would recognize the many variations, modifications, and alternative designs of optical couplers. For example, the configuration illustrated in FIG. 2 could employ any evanescent-type of optical coupler between the optical die and the optical substrate. To form evanescent optical couplers an optical waveguide in the optical die is placed in close proximity to an optical waveguide in the substrate so that an evanescent field generated by one waveguide excites a wave in the other waveguide. In other embodiments a grating type, edge coupled-type or other type of optical coupler can be formed between optical die 120 and optical substrate 105, as described in more detail below.

Figure 3:
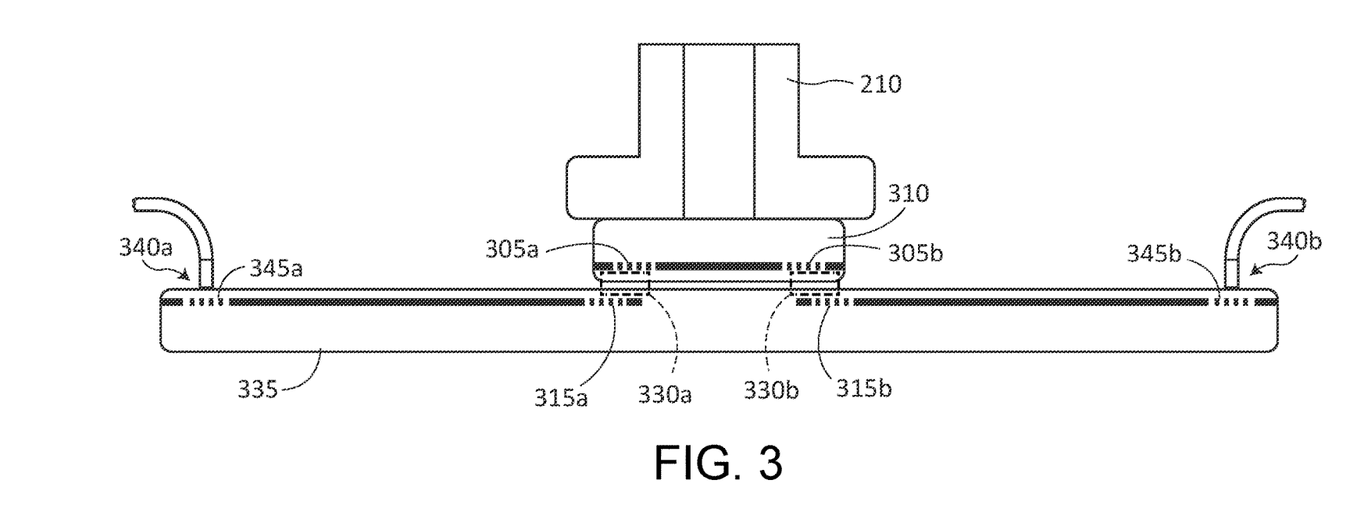
FIG. 3 illustrates a simplified cross-sectional view of an optical die during assembly to an optical substrate, according to an embodiment of the disclosure.

FIG. 3 illustrates an embodiment that is similar to the embodiment shown in FIG. 2, however in FIG. 3, a grating-type coupler is used for first and second optical couplers, 330a, 330b. As shown in FIG. 3 a first set of gratings 305a, 305b can be formed on optical die 310 and a second set of gratings 315a, 315b can be formed on optical substrate 335.

First and second pairs of gratings 305a, 305b, 315a, 315b, respectively, can be used to couple optical energy between the optical die 310 and the optical substrate 335. In other embodiment only first pair of gratings, 305a, 305b may be used, while in another embodiment only second pair of gratings 315a, 315b may be used.

As further shown in FIG. 3, in this embodiment test connectors 340a, 340b are formed using grating type couplers. More specifically, in-situ test equipment 245 (see FIG. 2) is coupled to optical substrate 335 using one or more grating-type features 345a, 345b that are formed on the optical substrate.

Figure 4:
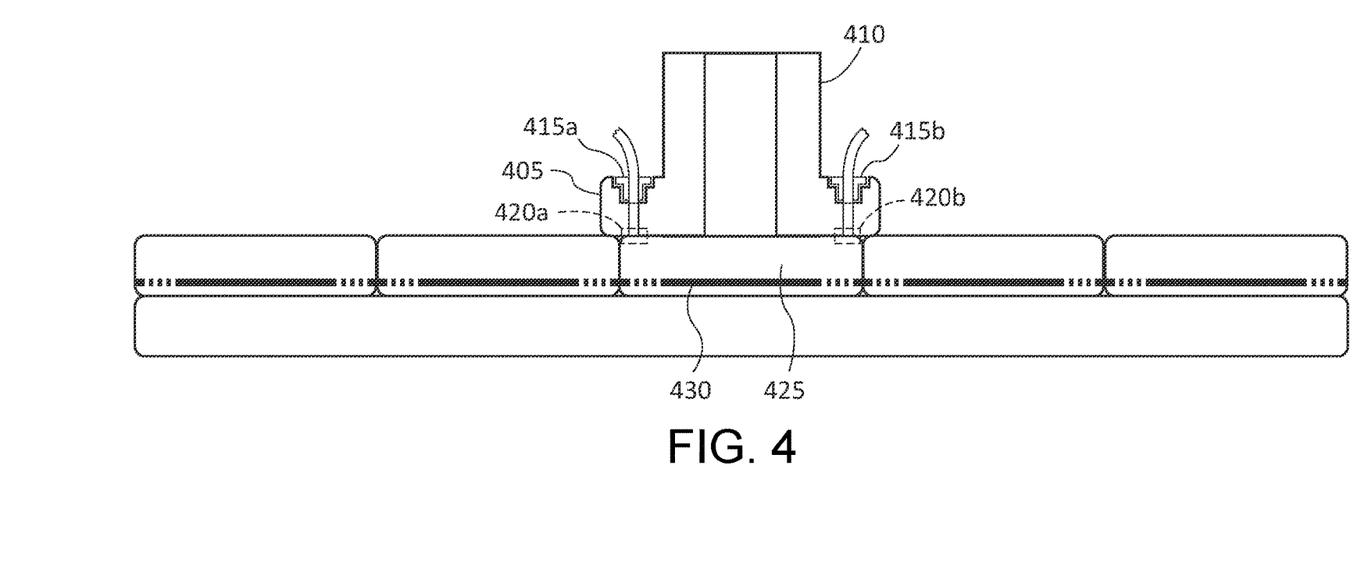
FIG. 4 illustrates a simplified cross-sectional view of an optical die while it is being aligned to a tool, according to an embodiment of the disclosure.

FIG. 4 illustrates an embodiment that is similar to the embodiment shown in FIG. 2, however in FIG. 4, instead of in-situ test equipment being coupled to the optical substrate as shown in FIG. 2, in-situ test equipment 245 (see FIG. 2) is coupled to optical die 405 through tool 410. As shown in FIG. 4, tool 410 includes optical connectors 415a, 415b that can be used to couple in-situ test equipment 245 (see FIG. 2) to tool optical couplers 420a, 420b that optically couple tool 410 to optical die 425. In some embodiments optical connectors 415a, 415b can be a terminated optical fiber or other type of optical coupler. Tool optical couplers 420a, 420b can be an optical waveguide, optical fiber or other type of optical coupler, some of which are described in more detail below. In some embodiments, when tool 410 is in contact with optical die 425, tool optical couplers 420a, 420b form an optical connection with optical die 425 such that in-situ test equipment can optically communicate with the optical die. In some embodiments, the performance of tool optical couplers 420a, 420b can be improved by adjusting a position of tool 410 relative to optical die 425, using a similar alignment method as described above in conjunction with in-situ test equipment.

In another embodiment, optical connectors 415a, 415b may be formed by holding a terminated optical fiber in place to form tool optical couplers 420a, 420b. In further embodiments, optical connectors 415a, 415b may be a terminated optical fiber connection formed between an optical fiber and a grating structure (not shown in FIG. 4) and tool optical couplers 420a, 420b may be a bottom portion of the grating structure that is adjacent interface surface. In another embodiment tool optical couplers 420a, 420b can be formed using an evanescent-type coupler, adiabatic-type coupler, edge-type coupler or any other optical coupling mechanism, some of which are described in more detail below.

In some embodiments optical die 425 may include one or more optical paths 430 that allow an optical signal to be passed through the die so in-situ test equipment can perform insertion loss or other testing of tool optical couplers 420a, 420b, as described in more detail below. In other embodiments optical die 425 can have one or more reflective features that enable optical signals to be injected into and reflected within the die for analysis by the in-situ test equipment for optimizing optical alignment of tool optical couplers 420a, 420b. In further embodiments, optimal optical alignment of tool optical couplers 420a, 420b may not be performed and only mechanical and/or image-assisted alignment of tool 410 to optical die 425 may be used.

In some embodiments optical die 425 may be tested by in-situ test equipment via tool 410 to determine one or more characteristics of the optical die. In some embodiments the in-situ test equipment can determine if optical die 425 is the correct die for the particular assembly operation (i.e., die verification). In other embodiments in-situ test equipment can perform testing of optical die 425 to determine if the optical die has appropriate performance characteristics (e.g., a process that may be known as known good die testing).

Figure 5:
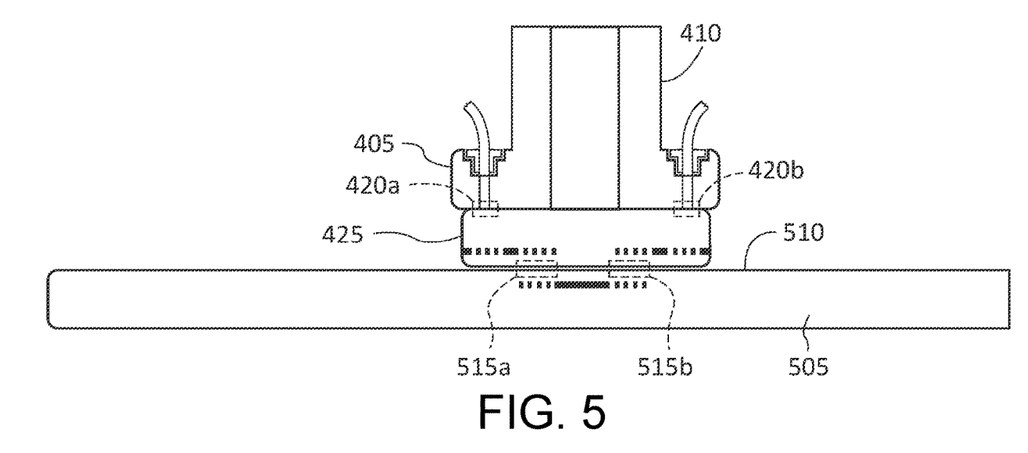
FIG. 5 illustrates a simplified cross-sectional view of the optical die illustrated in FIG. 4 during assembly to an optical substrate.

FIG. 5 illustrates tool 410 and optical die 425 of FIG. 4 after the tool has been aligned with optical die 425 and is now in the process of assembling the optical die to optical substrate 505. As shown in FIG. 5, tool 410 is aligned with optical die 425 and assembly machine 205 (see FIG. 2) has positioned the optical die adjacent a top surface 510 of optical substrate 505 to form optical couplers 515a, 515b between the optical die and the optical substrate. In some embodiments optical die 425 can have features that enable optical signals to be coupled from tool 410, through optical die 425 to optical substrate 505 and back to the in-situ test equipment. These features can enable the in-situ test equipment to test and optimize the alignment of optical couplers 515a, 515b formed between optical die 425 and optical substrate 505. These and other features will be described in more detail below.

In some embodiments having the in-situ test equipment coupled to optical die 425 via tool 410 may be beneficial as compared to having the optical test equipment coupled to the optical die via the optical substrate. In one embodiment, using tool 410 as an optical coupler may eliminate added time and complexity of connecting the in-situ test equipment to optical substrate 505. By using tool optical connectors 415a, 415b, tool optical couplers 420a, 420b can be "automatically" formed as the tool must be in contact with optical die 425 to pick up the optical die for placement on optical substrate 505. Further, by coupling the in-situ test equipment to optical couplers 515a, 515b via optical die 425, the optical signals from the in-situ test equipment are typically physically closer to the optical couplers which can result in improved test accuracy as compared to coupling the in-situ test equipment to optical substrate 505 at a connection that may be physically distant from the optical couplers.

In further embodiments optical die 425 can have features that enable optical signals to be coupled from tool 410 and features that enable optical signals to be coupled from optical substrate 505. As an example, in one embodiment an optical signal can be coupled from the in-situ test equipment, through tool 410, through optical die 425, through optical substrate 505 and out of the substrate to the in-situ test equipment. A separate optical signal can be coupled from the in-situ test equipment, through optical substrate 505, through optical die 425 and back through the substrate, or through the optical die and through the tool.

Figure 6:
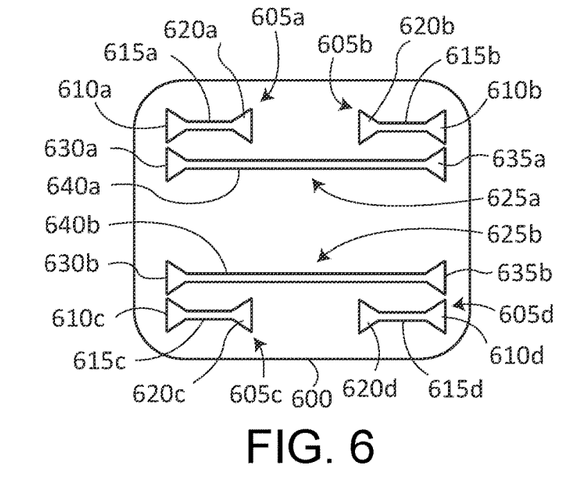
FIG. 6 illustrates a simplified plan view of an optical die that includes one or more features that enable the optical die to be optimally aligned with an optical substrate, according to an embodiment of the disclosure.

FIG. 6 illustrates one embodiment of an optical die 600 that includes one or more features that enable the optical die to be optimally aligned with an optical substrate via one or more methods described above. As shown in FIG. 6, optical die 600 has first waveguide features 605a . . . 605d that enable an optical signal to be transmitted from a tool (such as tool 410 shown in FIG. 5) through optical die 600 and to an optical substrate (such as optical substrate 505 shown in FIG. 5. More specifically each first waveguide feature 605a . . . 605d includes a first coupler 610a . . . 610d that couples optical die 600 to tool 410 via tool optical couplers (such as tool optical couplers 420a, 420b shown in FIG. 5). Each first waveguide feature 605a . . . 605d also includes a respective second coupler 620a . . . 620d that couples optical die 600 to optical substrate (such as optical substrate 505 shown in FIG. 5). Each first waveguide feature 605a . . . 605d includes a respective first waveguide 615a . . . 615d that couples each first coupler 610a . . . 610d to each respective second coupler 620a . . . 620d.

As further shown in FIG. 6, optical die 600 can also have one or more second waveguide features 625a, 625b that enable an optical signal to be transmitted from optical substrate (such as optical substrate 105 shown in FIG. 2) through optical die (such as optical die 120 shown in FIG. 2) and back to the optical substrate. More specifically each second waveguide feature 625a, 625b includes a third coupler 630a, 630b that couples optical die 120 to substrate 105 via optical couplers (such as optical coupler 230a shown in FIG. 2). Each second waveguide feature 625a, 625b also includes a respective fourth coupler 635a, 635b that couples optical die 120 to optical substrate via optical couplers (such as optical coupler 230b shown in FIG. 2). Each second waveguide feature 625a, 625b includes a respective second waveguide 640a, 640b that couples each third coupler 630a, 630b to each respective fourth coupler 635a, 635b.

Figure 7A:
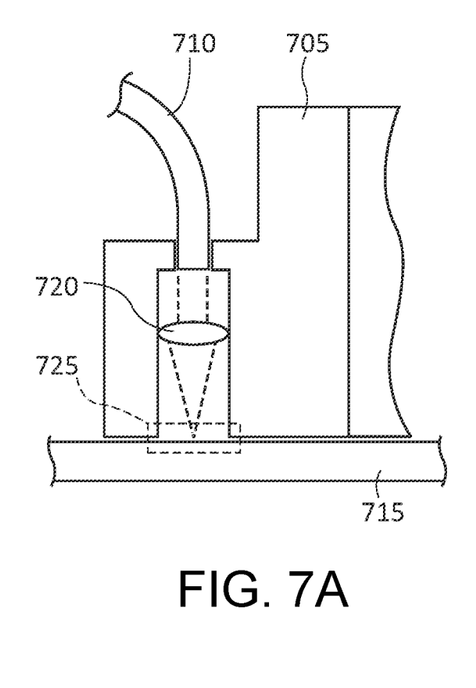
FIGS. 7A-7C illustrate simplified left-side partial views of tools that include different types of tool optical couplers, according to embodiments of the disclosure.
Figure 7B:
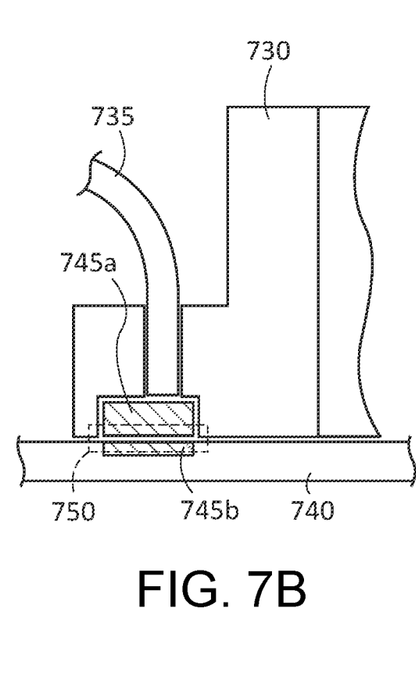
Figure 7C:
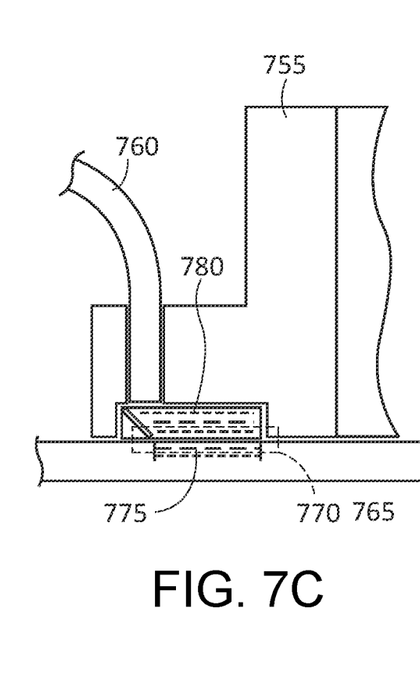

FIGS. 7A-7C illustrate simplified left-side partial views of tools that include different types of tool optical couplers to form optical connections to optical die. As shown in FIG. 7A, in one embodiment tool 705 includes an optical fiber 710 that is coupled to optical die 715 via one or more lenses 720. One or more lenses 720 can be used to focus optical energy emitted from optical fiber 710 to a region of optical die 715, such as for example a grating region, to form tool optical coupler 725. In other embodiments the one or more lenses 720 can be used to focus optical energy emitted from optical die to a region of optical fiber 710. In further embodiments, one or more optical lenses 720 can be reversed such that a signal transmitted from a relatively small region of optical fiber 710 and/or optical die 715 can be expanded to a relatively larger region. In some embodiments more than one lens can be used to achieve the desired shape and/or quality of the transmitted beam.

As shown in FIG. 7B, in one embodiment pick up tool 730 includes an optical fiber 735 that is coupled to optical die 740 via a first and second grating 745a, 745b, respectively. As shown in FIG. 7B, first grating 745a can be optically coupled to optical fiber 735 and second grating 745b can be optically coupled to optical die 740. First and second gratings 745a, 745b, respectively can communicate optical signals there between, forming tool optical coupler 750. In one embodiment first grating 745a can be eliminated and optical fiber 735 can optically communicate with second grating 745b on optical die 740. In another embodiment second grating 745b can be eliminated and optical die 740 can optically communicate with first grating 745a.

As shown in FIG. 7C, in one embodiment tool 755 includes an optical fiber 760 that is coupled to optical die 765 via an adiabatic or evanescent-type optical coupler 770. As shown in FIG. 7C, tool optical coupler 770 may include a mirror or other structure that turns the optical signal to be parallel with optical die 765 such that adiabatic and or evanescent-type of coupling can be performed between tool 755 and optical die 765. Optical die 765 includes a coupling element 775 such as a waveguide or other structure that couples optical energy to tool coupling element 780 forming tool optical coupler 770. As would be appreciated by one of skill in the art with the benefit of this disclosure, other types of optical coupling can be performed between tools and optical die and between optical die and the optical substrate.

Figure 8:
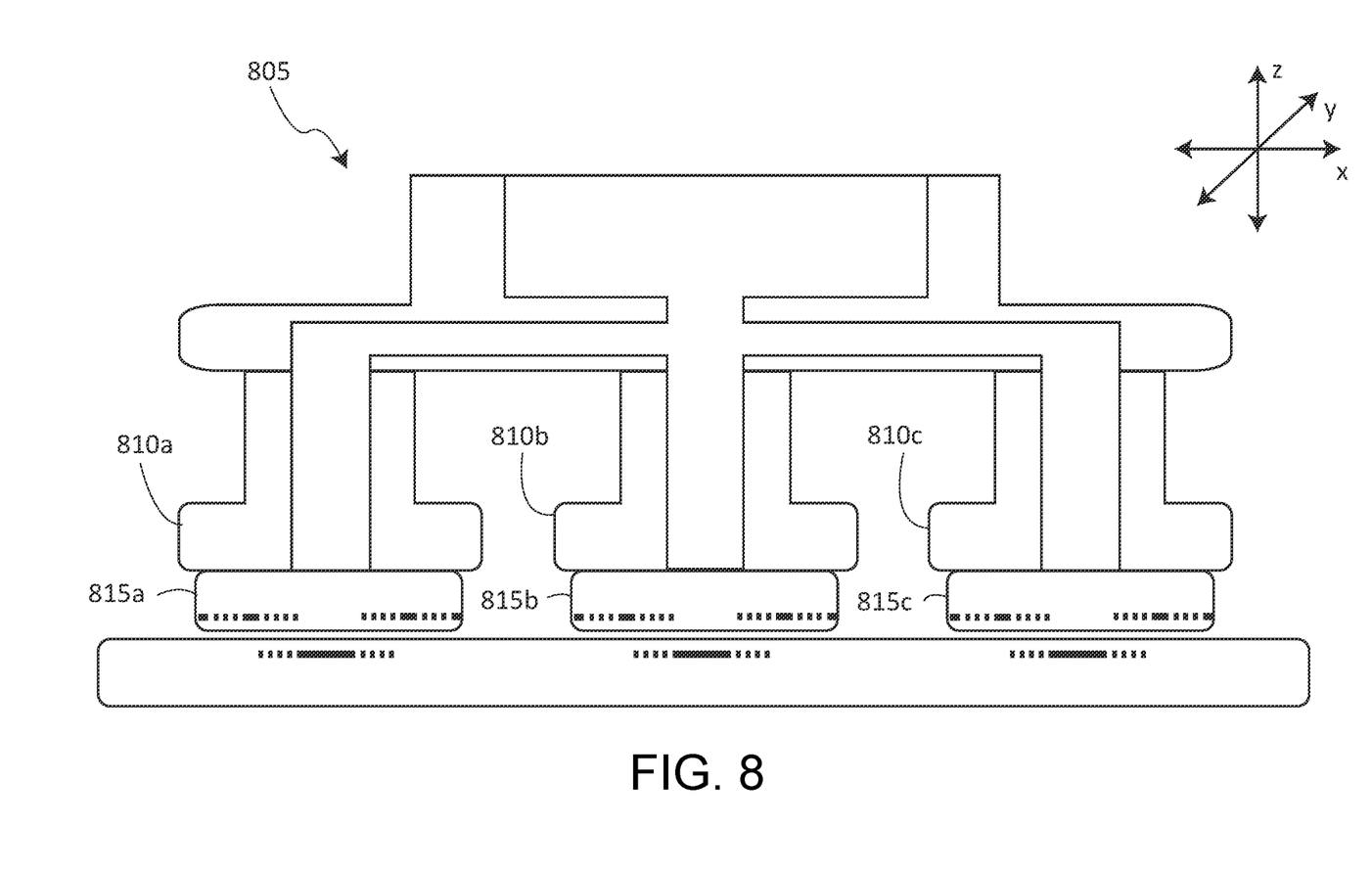
FIG. 8 illustrates an simplified cross-sectional view of a ganged head that can hold a plurality of tools, according to an embodiment of the disclosure.

FIG. 8 illustrates an embodiment of a ganged head 805 that can be attached to assembly machine 205 (see FIG. 2) and includes three separate pick and place tools 810a, 810b, 810c that can hold three separate optical die 815a, 815b, 815c, according to embodiments of the disclosure. As shown in FIG. 8, each tool 810a, 810b, 810c is similar to tool 410 shown in FIG. 4, however in this embodiment the three tools 810a, 810b, 810c are a part of ganged head 805. Ganged head 805 includes three independent mechanisms that enable each tool 810a, 810b, 810c to hold and independently move a separate optical die 815a, 815b, 815c.

In some embodiments tools 810a, 810b, 810c can be moved by the main gantry mechanism of assembly machine 205 (see FIG. 2) to perform relatively long movements across a work area, such as from a wafer (e.g., a pick region) to an optical substrate (e.g., a place region). To perform relatively short movements, such as optimizing alignment of optical couplers, as described in more detail above, each tool 810a, 810b, 810c can be attached to a sub-stage that can independently move each optical die. In some embodiments each sub-stage can independently move each respective tool 810a, 810b, 810c in East-West (e.g., X) and North-South (e.g., Y) directions in addition to rotation (e.g., theta). Therefore, each optical die 815a, 815b, 815c can be moved independently of the others, such as during optimizing alignment and performance of optical couplers formed between each optical die and optical substrate. In some embodiments ganged head 805 can improve throughput of assembly machine 205 (see FIG. 2) by gang picking (e.g., simultaneously or substantially simultaneously), gang moving and gang placing multiple optical die. A person of skill in the art will appreciate that, in other embodiments, ganged head 805 can have two, three, four or any number of independently manipulable tools 810a, 810b, 810c.

Figure 9:
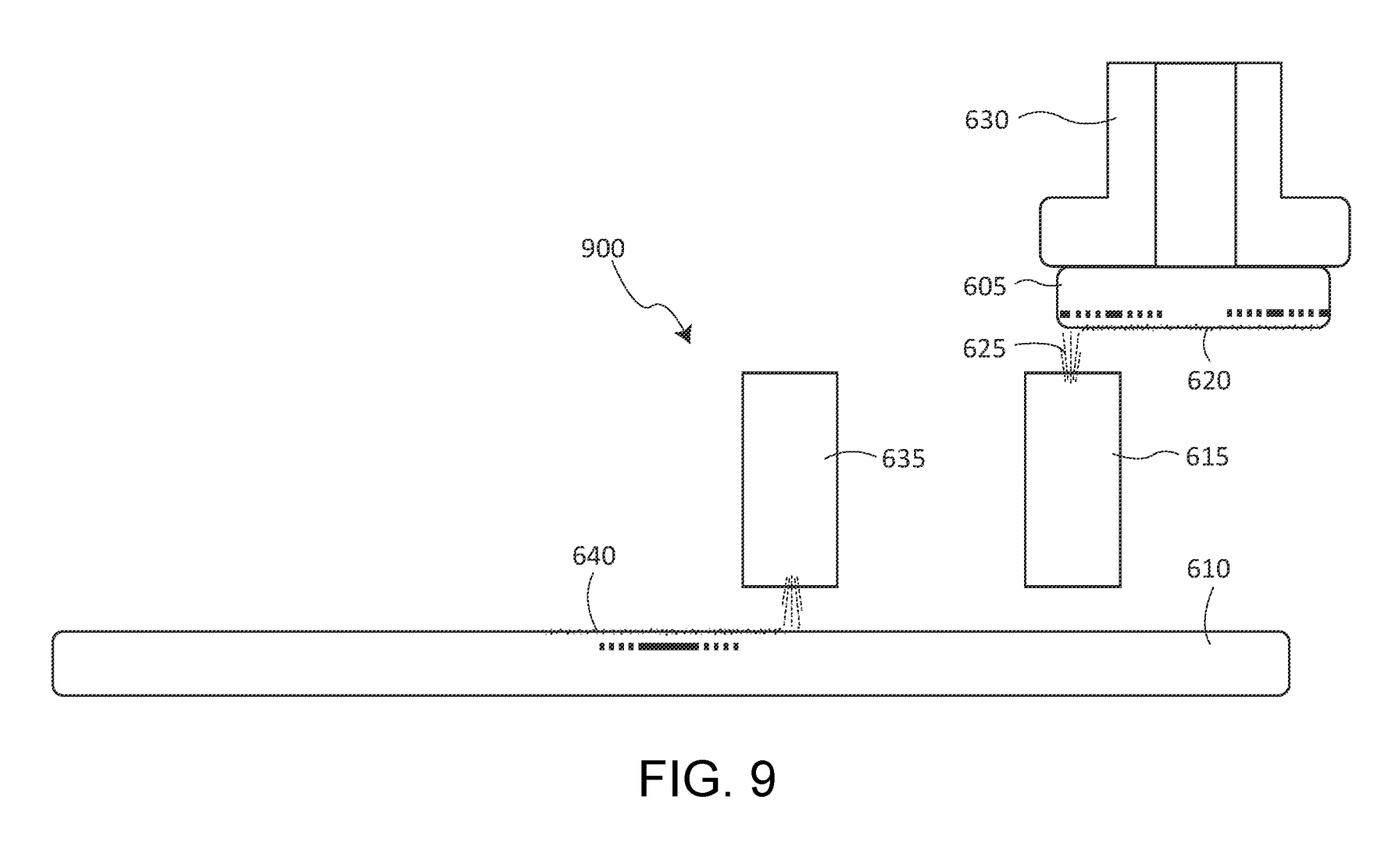
FIG. 9 illustrates a simplified side view of an assembly machine that employs one or more surface treatment systems, according to an embodiment of the disclosure.

FIG. 9 illustrates a simplified partial view of an assembly machine 900 that employs one or more surface treatment features, according to embodiments of the disclosure. As shown in FIG. 9, in some embodiments it may be desirable to form a fusion bond between an optical die 605 and an optical substrate 610 to optimize the performance of the optical couplers formed between the optical die and the optical substrate. In some embodiments a first in-situ plasma cleaner 615 can be used to clean a bonding surface 620 of optical die 605 using a first plasma stream 625. In various embodiments first in-situ plasma cleaner 615 can be moved across the entire bonding surface 620 of optical die 605 while the optical die is being retained by tool 630.

In some embodiments a second in-situ plasma cleaner 635 can be passed over an entire bonding surface 640 of optical substrate 610 in a region where optical die 605 is to be fusion bonded. After plasma cleaning on optical die 605 and optical substrate 610 are completed the optical die can be placed in contact with the optical substrate, but not with enough force to cause fusion bonding. During this time, in-situ optical test equipment can be used to transmit feedback to the assembly machine 900 to optimize the optical alignment of optical die 605 to optical substrate 610. Once optimal alignment is achieved assembly machine 900 can increase the force between optical die 605 and optical substrate 610 to cause fusion bonding. In some embodiments additional heat and/or ultrasonic motion can be applied to optical die 605 and/or optical substrate 610 to form the fusion bond.

One of ordinary skill, with the benefit of this disclosure, would recognize many variations, modifications, and alternatives. In some embodiments the optical substrate may include capabilities and/or intelligence to perform its own testing without the use of external in-situ test equipment. More specifically, in some embodiments optical substrate (and the associated optical assembly) may be capable of generating an optical test signal, evaluating the coupling between the die and the substrate, and reporting a result to the assembly machine via optical, direct electrical or indirect wireless methods. Thus, in some embodiments some or all of the in-situ test equipment may not be needed. In other embodiments integrated test capabilities can be used in conjunction with in-situ test equipment.

In further embodiments, an optical die may include a first set of optical features that are used for optimizing alignment of optical couplers and a second set of optical features that form functional optical couplers for operation of the final optical circuit. In one embodiment a first set of grating-type optical coupler features can be used for optimizing optical alignment of the optical die to the optical substrate and a second set of grating-type optical coupler features can be used to functionally couple the optical die to the optical substrate. In various embodiments the same type of optical features for alignment can be used for in-circuit operation so similar manufacturing and process variations are accounted for in the alignment process. However in other embodiments different types of optical couplers can be used for alignment and in-circuit operation.

Figure 10:
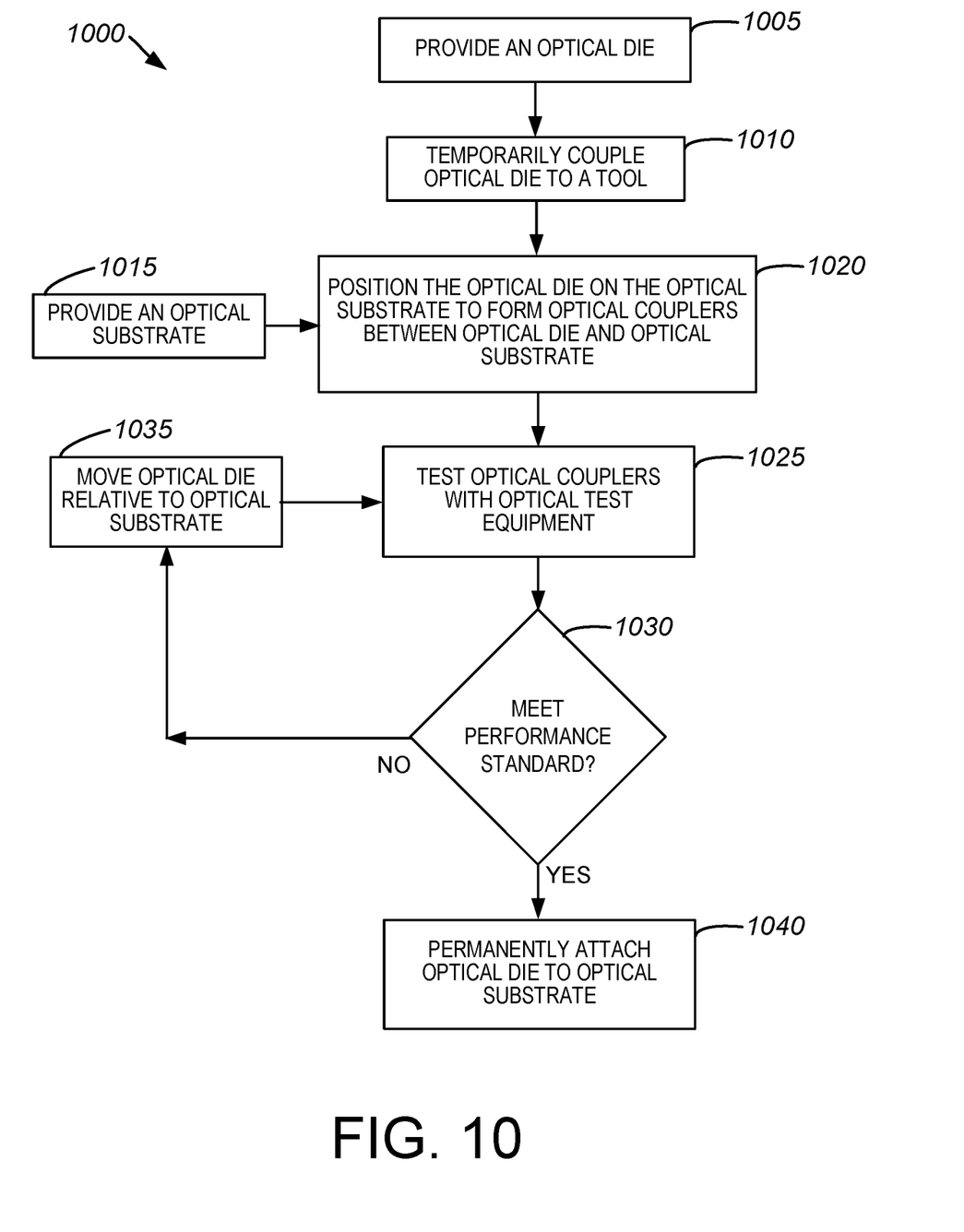
FIG. 10 illustrates steps associated with a method of aligning an optical die to an optical substrate, according an embodiment of the disclosure.

FIG. 10 illustrates steps associated with a method 1000 of aligning an optical die to an optical substrate according embodiments of the disclosure. As illustrated in FIG. 10, in step 1005 an optical die is provided. In some embodiments the optical die may have one or more optical functions such as an optical source, an optical filter, an optical splitter an optical amplifier or other function.

In step 1010 the optical die is temporarily coupled to a tool of an assembly machine. In some embodiments the assembly machine is a pick and place machine wherein the tool is attached to a gantry mechanism of the machine. In some embodiments the tool employs a vacuum port to temporarily secure the optical die to the tool. In further embodiments the tool can have one or more tool optical couplers that are aligned with optical features on the optical die to facilitate testing and alignment of the optical die and substrate, as described in more detail herein.

In step 1015 an optical substrate is provided. In some embodiments the optical substrate is retained on a work platform of the assembly machine which can be accessed by the gantry mechanism. In some embodiments the optical substrate is configured to receive a plurality of optical die and to interconnect each optical die.

In step 1020 the optical die is positioned on the optical substrate by the tool. In some embodiments when the optical die is positioned on the optical substrate one or more optical couplers are formed between the optical die and the optical substrate. The optical die may be temporarily placed on or near the optical substrate to form the optical couplers.

In step 1025 optical test equipment, which may be in-situ (e.g., integrated within the assembly system) and configured to test the optical couplers. In one embodiment the test equipment is operatively coupled to the optical substrate and test the optical couplers. In another embodiment the test equipment is operatively coupled to the tool via tool optical couplers which are coupled through the optical die and to the optical couplers formed between the optical die and the optical substrate. The test equipment can perform one or more optical tests of the optical couplers and transmit results to the assembly machine.

In step 1030 the test results are evaluated against a predetermined threshold (e.g., performance standard). In some embodiments the performance standard is a minimum acceptable performance of the optical couplers. If the optical couplers do not meet the performance standard then the assembly machine moves the optical die relative to the optical substrate and proceeds back to step 1025 for further testing. This sequence may be repeated until the optical couplers meet the performance standard. In this way the alignment of the optical die can be optimized such that the optical couplers perform to a minimum standard.

In step 1040 the optical couplers have met the performance standard and the optical die is then permanently attached to the optical substrate while maintaining the optimized alignment. In some embodiments the optical die is attached using fusion bonding, however in other embodiments other types of bonding can be performed.

It will be appreciated that method 1000 is illustrative and that variations and modifications are possible. Steps described as sequential may be executed in parallel, order of steps may be varied, and steps may be modified, combined, added or omitted.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A system for assembling an optical die to an optical substrate, the system comprising:
    a gantry mechanism;
    a tool attached to the gantry mechanism and including:
        a mating surface for temporarily interfacing the tool to the optical die;
        a retention apparatus configured to temporarily couple the optical die to the mating surface; and
        a tool optical coupler positioned at the mating surface and configured to form an optical connection to the optical die when the optical die is positioned at the mating surface;
    a platform disposed under the gantry mechanism and configured to retain the optical substrate;
    optical test equipment operatively coupled to the tool optical coupler; and
    a controller, wherein an input terminal of the controller is coupled to an output terminal of the optical test equipment.

2. The system of claim 1 further comprising a first optical coupler formed between the optical die and the optical substrate when the optical die is positioned on the optical substrate and the tool optical coupler is operatively coupled to the first optical coupler.

3. The system of claim 2 wherein an input port of the optical test equipment is coupled to the first optical coupler, the optical test equipment is configured to perform optical testing of the first optical coupler and generate results, and the results are transmitted from the optical test equipment to the controller.

4. The system of claim 3 wherein the controller compares the results to a threshold and determines if the optical die needs to be moved relative to the optical substrate.

5. The system of claim 2 wherein the first optical coupler is a grating-type optical coupler.

6. The system of claim 1 wherein the tool is a first tool of a plurality of tools.

7. The system of claim 1 further comprising a plasma cleaner positioned below the optical die and configured to plasma clean a bonding surface of the optical die.

8. The system of claim 1 further comprising a plasma cleaner positioned above the optical substrate and configured to plasma clean a bonding surface of the optical substrate.

9. The system of claim 1 wherein the controller is electrically connected to the gantry mechanism and the tool and is configured to operate the tool to apply a force between the optical die and the optical substrate to fusion bond the optical die to the optical substrate.

10. The system of claim 1 wherein the tool optical coupler is configured to be aligned with the optical die before temporarily interfacing the tool to the optical die.

11. The system of claim 1 wherein the tool optical coupler is a terminated optical fiber.

12. The system of claim 3 wherein the input port of the optical test equipment is coupled to the first optical coupler through a first waveguide disposed in the optical substrate.

13. The system of claim 12 wherein the first optical coupler is configured to couple optical signals from the first waveguide to the optical die.

14. The system of claim 1 wherein the optical test equipment is operatively coupled to the tool optical coupler via at least one test connector.

15. The system of claim 14 wherein the at least one test connector comprises grating type couplers.

* * * * *